US006731906B2

United States Patent
Sokolovskiy et al.

(10) Patent No.: US 6,731,906 B2
(45) Date of Patent: May 4, 2004

(54) METHOD AND SYSTEM FOR DETERMINING THE PHASE AND AMPLITUDE OF A RADIO OCCULTATION SIGNAL

(75) Inventors: Sergey V. Sokolovskiy, Boulder, CO (US); Christian Rocken, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 476 days.

(21) Appl. No.: 09/840,261

(22) Filed: Apr. 23, 2001

(65) Prior Publication Data

US 2002/0155809 A1 Oct. 24, 2002

(51) Int. Cl.$^7$ ............................................... H04B 7/185
(52) U.S. Cl. ..................... 455/12.1; 455/427; 455/189.1
(58) Field of Search ........................... 455/12.1, 24, 65, 455/3.2, 52.2, 15, 311, 20, 21, 22, 40, 67.6, 115.1, 118, 131, 189.1, 226.1, 355, 505, 306; 342/357.12, 358

(56) References Cited

U.S. PATENT DOCUMENTS

| | | | | |
|---|---|---|---|---|
| 5,579,347 A | * | 11/1996 | Lindquist et al. | ........... 375/346 |
| 5,675,081 A | * | 10/1997 | Solheim et al. | ........... 73/170.28 |
| 6,028,887 A | * | 2/2000 | Harrison et al. | ............ 375/147 |
| 6,134,282 A | * | 10/2000 | Ben-Efraim et al. | ........ 375/350 |
| 6,263,028 B1 | * | 7/2001 | Nagano | ....................... 375/329 |
| 2001/0012318 A1 | * | 8/2001 | Hasegawa et al. | .......... 375/150 |
| 2002/0155809 A1 | * | 10/2002 | Sokolovskiy et al. | ...... 455/12.1 |

* cited by examiner

*Primary Examiner*—Nay Maung
*Assistant Examiner*—Tan Trinh
(74) *Attorney, Agent, or Firm*—Duft Setter Ollila & Bornsen LLC

(57) ABSTRACT

The present system for determining the phase and amplitude of a radio occultation signal modifies the traditional Open Loop tracking process to maximize the signal-to-noise ratio, minimize the sampling rate, and also preserve the structure of the radio occultation signals. A radio occultation system includes a transmitter system, a receiver system, and a post-processing system. The receiver system receives the radio signal that is transmitted by the transmitter system through the earth's atmosphere, where it is occulted, and down converts the received radio occultation signal to generate a down converted signal based on a phase model that uses a refractivity climatology. The receiver system then low pass filters the down converted signal and samples the in-phase and quadrature components of the down converted and low pass filtered signal. The post-processing system receives the in-phase and quadrature components of the down converted and low pass filtered signal, determines the mean residual frequency, and performs additional down conversion of the sampled signal to eliminate aliasing. The post-processing system then re-samples the down converted signal at a higher sampling rate and calculates the accumulated phase and amplitude from the re-sampled signal.

22 Claims, 3 Drawing Sheets

METHOD AND SYSTEM FOR DETERMINING THE PHASE AND AMPLITUDE OF A RADIO OCCULTATION SIGNAL

FIELD OF INVENTION

This invention relates to a system that determines the phase and amplitude of an occulted radio signal using open loop tracking.

PROBLEM

Radio occultation remote sensing of the atmosphere, termed "radio occultation" herein, includes the measurement of the phase and amplitude of a radio signal where the atmosphere or ionosphere of a planetary body is positioned between a transmitter and a receiver. The phase measurements can be very accurate and they contain information about the refractivity of the atmosphere or ionosphere and about the planetary surface.

Radio occultation has been applied to the earth's atmosphere with the use of Global Positioning System (GPS) transmitters. As shown in FIG. 1, the earth 100, the earth's atmosphere 102, and the earth's ionosphere 103 are positioned between an occulted transmitter system, such as Global Positioning System satellite 104, and a receiver system, such as Low Earth Orbiting (LEO) satellite 106, that is equipped with a radio occultation receiver. The Global Positioning System satellite 104 orbits the earth 100 at an approximate altitude of 20,200 km. The Low Earth Orbiting satellite 106 orbits the earth 100 at an approximate altitude of 300–1,000 km. The radio occultation receiver can also be placed on any airborne platform, such as an aircraft or balloon, or can be ground-based. The Global Positioning System satellite 104 transmits a radio signal 108 to the Low Earth Orbiting satellite 106. As the radio signal 108 traverses the earth's atmosphere 102 and ionosphere 103, the phase and amplitude of the radio signal 108 can be measured by the Low Earth Orbiting satellite 106 and then inverted to compute atmospheric parameters for weather and climate applications. Another application of radio occultation uses ground-based receivers 110 to obtain the phase and amplitude data.

The received signal can be used to compute signal bending angles. The bending angles calculated from the radio occultation signals are further used for determining the atmospheric refractivity, or for direct assimilation into Numerical Weather Prediction (NWP) models. The determined refractivity is further used for determining pressure, temperature, and humidity or for direct assimilation into Numerical Weather Prediction (NWP) models. The phase of ground-received radio occultation signals can be used to extract information about atmospheric moisture or for direct assimilation into Numerical Weather Prediction (NWP) models. The bending angles calculated from the ground-received radio occultation signals can be used to correct radar observations at low elevation angles.

In both of these applications of radio occultation, the receiver systems 106, 110 have used digital Phase-Locked Loop (PLL) signal processing to extract the phase and amplitude from the radio occultation signal 108. In Phase-Locked Loop signal processing, the phase and amplitude are extracted in real time, after down conversion of the input radio occultation signal 108, using a phase model that is recurrently updated by extrapolation of the previously extracted phase. The feedback between the phase model and the input radio occultation signal 108 makes the Phase Locked Loop signal processing an optimal tracking technique for single tone signals that are corrupted with noise. On the other hand, the feedback makes tracking of the received radio occultation signal 108 that has complicated dynamics, such as multiple tone signals, an unstable process and may result in errors in the output phase. Also, the use of feedback results in an inability of the system to track signals, i.e., in the loss of lock, under the conditions of low signal-to-noise ratio (SNR) and complicated signal structure.

To obtain an accurate calculation of the bending angles of the radio signal occulted by the earth's atmosphere, multiple tones, contained in the radio occultation signals, must be resolved. For space-received radio occultation signals, multipath propagation in the moist troposphere section of the earth's atmosphere results in strong fluctuations of both phase and amplitude. In particular, random phase accelerations are much larger than those that can be tracked by the Phase-Locked Loop signal processing in a Low Earth Orbiting (LEO) satellite 106 receiver. For ground-received radio occultation signals, the multipath is caused primarily by signals reflected from the earth's surface. Reflections from the sea surface cause periodic deep fades in the amplitude of the radio occultation signals. In both applications, the Phase-Locked Loop signal processing is not capable of tracking radio occultation signals without a corruption or loss of lock. Also, the Phase-Locked Loop signal processing is not capable of tracking a threshold of the rising occultations, as it needs time to maintain lock on the signal. In both applications, the radio occultation data are most valuable at low altitudes (elevations).

Open-Loop (OL) tracking has been used in radio occultation studies of planetary atmospheres to complement the Phase Locked Loop signal processing. Open-Loop tracking is basically the raw sampling of the down converted complex signal. In Open-Loop tracking there is no feedback between the phase model used for the down conversion and the received signal. The advantage of Open-Loop tracking is that it is not susceptible to the complicated structure of the input signal and the input signal is never lost. One disadvantage of Open-Loop tracking is the low Signal-to-Noise Ratio (SNR) due to aliasing of the noise into the sampling frequency domain. This disadvantage is especially perceptible when tracking radio occultation signals with low gain antennas, such as those used on micro-satellites.

SOLUTION

The above-described problems are solved and a technical advance achieved by the present system for determining the phase and amplitude of a radio occultation signal that modifies the traditional Open Loop tracking process to maximize the signal-to-noise ratio, minimize the sampling rate, and also preserve the structure of the radio occultation signals. A radio occultation system includes a transmitter system, a receiver system, and a post-processing system. The receiver system receives the radio signal that is transmitted by the transmitter system through the earth's atmosphere where it is occulted and down converts the received radio occultation signal in real-time to generate a down converted signal based on a phase model. The receiver system then low pass filters the down converted signal and samples its in-phase and quadrature components. The post-processing system receives the in-phase and quadrature components of the down converted and low pass filtered signal, determines the mean residual frequency and performs additional down conversion of the sampled signal to eliminate aliasing. The post-processing system then re-samples the additionally down converted signal at a higher sampling rate and calculates the accumulated phase and amplitude from the re-sampled signal. The present system for determining the phase and amplitude of a radio occultation signal therefore obtains a signal-to-noise ratio that is comparable to Phase Locked Loop signal processing, by using Open-Loop tracking.

DETAILED DESCRIPTION

Figure 3:
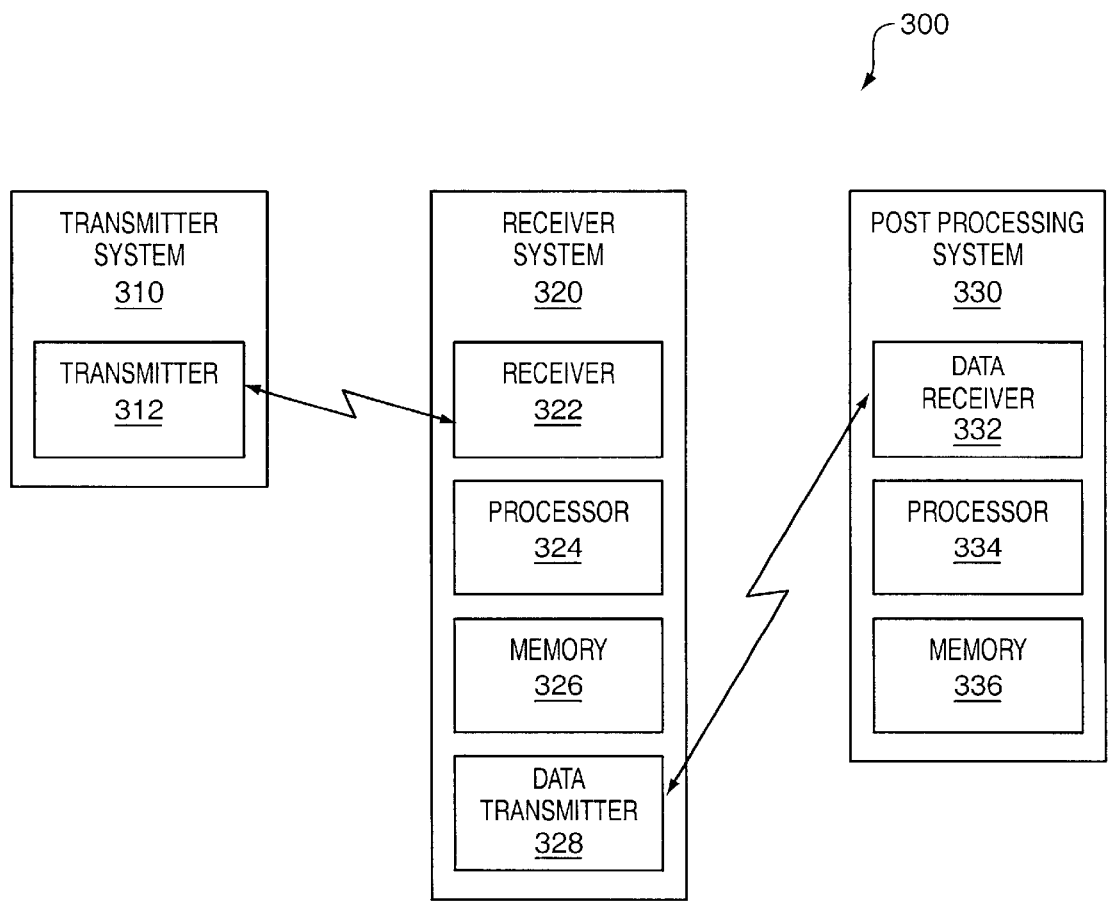
FIG. 3 illustrates in block diagram form the overall architecture of the present system for determining the phase and amplitude of a radio occultation signal.

As shown in FIG. 3, a radio occultation system includes a transmitter system 310, a receiver system 320, and a post-processing system 330. The present system for determining the phase and amplitude of a radio occultation signal 300 modifies the traditional Open Loop tracking process used in such a system to maximize the signal-to-noise ratio, minimize the sampling rate, and also preserve the structure of the radio occultation signals 108. A phase and/or frequency model of the radio occultation signals 108 is first generated, using the predicted transmitter system and receiver system positions and velocities, and also taking into account the refraction of radio waves in a standard atmosphere, such as by use of climatology data. This can be typically accomplished by the use of a model of the radio signal ray bending angle as a function of the altitude of the ray asymptote over the Earth's referenced ellipsoid, taking into account latitude and/or seasonal variability. However, the model can also be computed independent of a consideration of latitude and/or seasonal variability. The use of the ray bending model minimizes the required filter bandwidth that must take into account both the spread of the radio occultation signal spectrum and any mis-modeling of the mean radio frequency. The sampling rate must not be smaller than the spread of the spectrum of the radio occultation signal. The aliasing of the sampled radio occultation signal caused by mis-modeling of the mean frequency can be eliminated by additional down conversion of the radio occultation signal during post-processing. The frequency model for this down conversion is obtained by detection of the mean frequency shift with the use of a sliding window spectral analysis of the sampled signal. Each window contains a section of data for a given short time interval and the frequency shift of the received radio occultation signal is detected based on the maximum of cross-correlation between the aliased radio occultation signal spectrum and a model of the radio occultation signal spectrum. After the additional down conversion, the radio occultation signal is re-sampled at a higher rate in order to make the phase change from epoch to epoch much less than one cycle for cycle slip detection and repair. Then, amplitude and accumulated phase (phase in excess of that determined by the phase model) are reconstructed. The pre-calculated phase and/or frequency model can also be used for aiding demodulation of the GPS radio occultation signal by controlling the delay of the code replica under conditions of low signal-to-noise ratio. In this case the delay calculated by delay-locked loop under the conditions of normal signal-to-noise ratio can be used as initial condition.

Radio Frequency Spectrum for the Radio Occultation Signal

Figure 1:
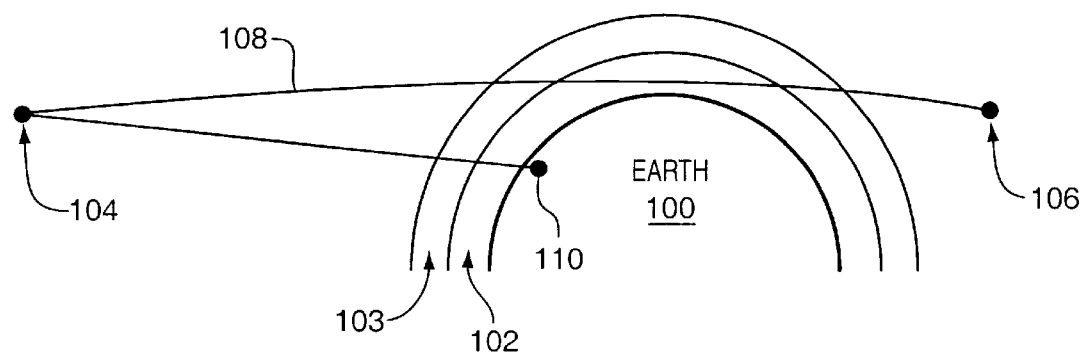
FIG. 1 is an illustration of a system for Global Positioning Meteorology that uses a satellite-based receiver and/or a ground-based receiver.
Figure 2:
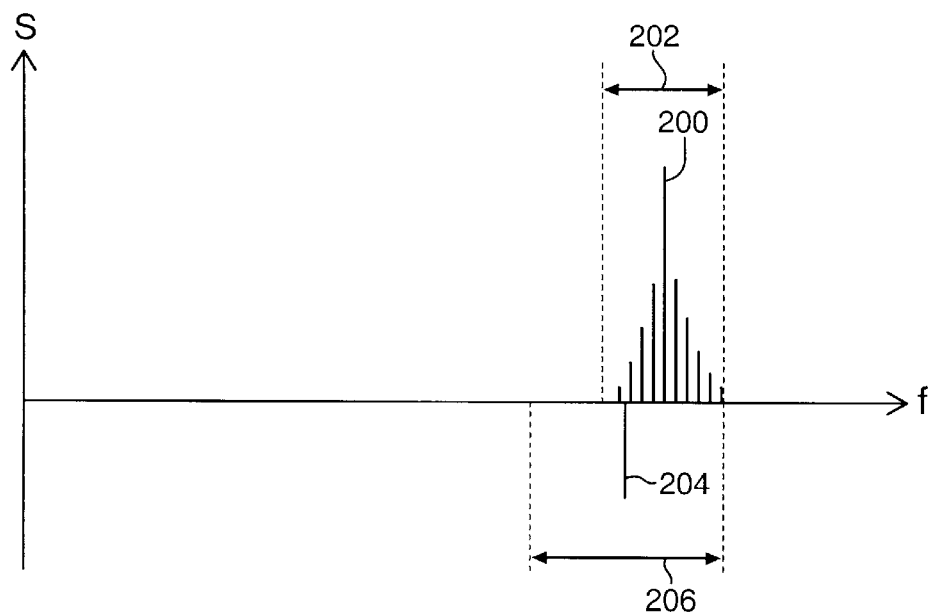
FIG. 2 is a diagram of a typical radio frequency spectrum for a radio occultation signal.

FIG. 2 is a diagram of a typical radio frequency spectrum for a radio occultation signal 108 as shown in the frequency domain. The frequency of this signal is given as f, while the spectral amplitude is S. The mean frequency of the radio occultation signal 108 is 200, while 202 is the spectral spread of the radio occultation signal 108. The predicted (modeled) frequency of the radio occultation signal 108 is 204, while 206 is the bandwidth used for low pass filtering of the received and down converted radio occultation signal 108.

The present system for determining the phase and amplitude of a radio occultation signal 300 uses a standard refraction model in the atmosphere to calculate the frequency model of the radio occultation signal 108 and this allows the system to minimize the mean residual frequency after the real-time down conversion of the received radio occultation signal 108. Thus, the system for determining the phase and amplitude of a radio occultation signal 300 minimizes the bandwidth of the low pass filtering 206 and maximizes the signal-to-noise ratio. The present system for determining the phase and amplitude of a radio occultation signal 300 also detects the mean residual frequency of the sampled radio occultation signal 108 in a post-processing operation and uses the detected frequency as a model for an additional down conversion to eliminate aliasing, allowing the use of a sampling rate that is not larger than the spread of the spectrum 202 of the radio occultation signal 108.

Architecture of the Overall System

Figure 4:
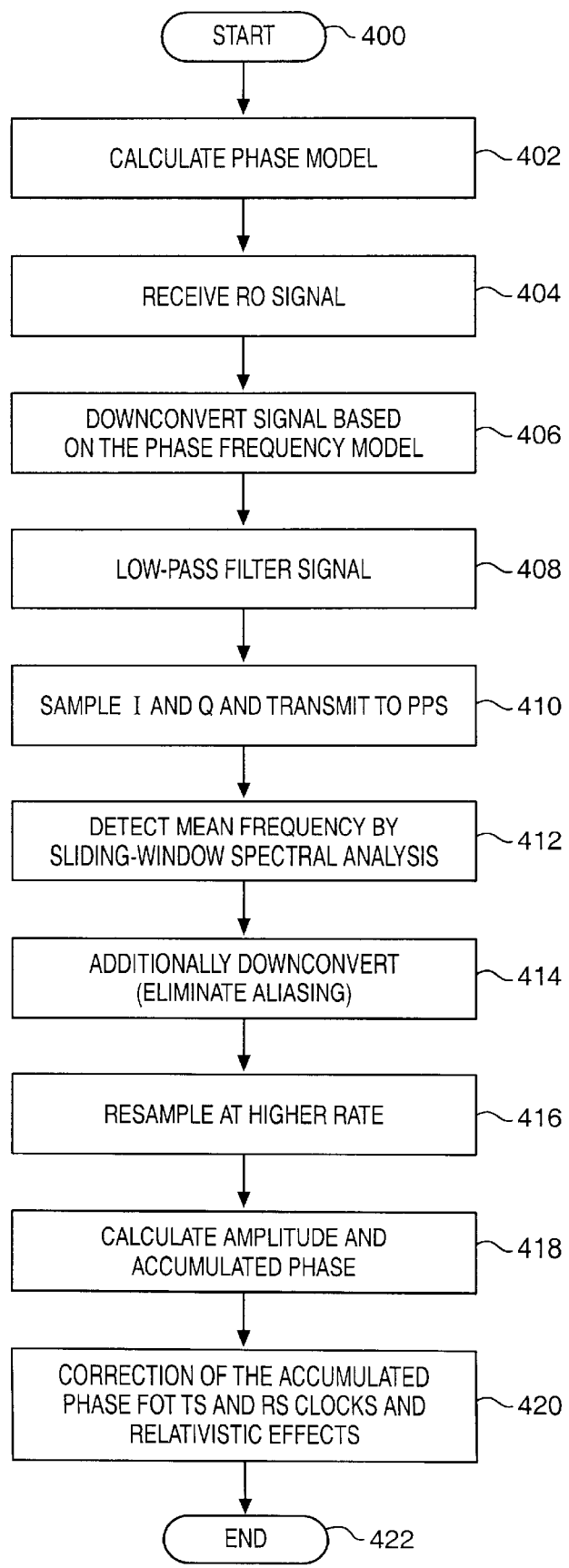
FIG. 4 illustrates in flow diagram form the operation of the present system for determining the phase and amplitude of a radio occultation signal.

FIG. 3 illustrates in block diagram form the overall architecture of the present system for determining the phase and amplitude of a radio occultation signal 300 and FIG. 4 illustrates in flow diagram form the operation of the present system for determining the phase and amplitude of a radio occultation signal 300. Those skilled in the art will appreciate numerous variations in a radio occultation system configuration and operation that are within the scope of the invention. Those skilled in the art will also appreciate how the principles illustrated in this example can be used in other examples of the invention.

FIG. 3 is a system level block diagram of a radio occultation system 300 that includes a transmitter system 310 (such as Global Positioning System satellite 104), a receiver system 320 (such as Low Earth Orbiting satellite 106 or ground-based receiving station 110), and a post-processing system (PPS) 330. Typically, the post-processing system 330 is positioned on the ground. The receiver system 320 can either be located on the ground (110), or airborne, such as on a satellite (106), aircraft or balloon. The transmitter system 310 includes a transmitter 312. The receiver system 320 includes a receiver 322, receiver processor 324, receiver memory 326 and data transmitter 328. The post-processing system 330 includes a data receiver 332, a post-processing system processor 334, and a post-processing system memory 336.

The transmitter system 310 is any transmission system configured to transmit radio signals to the receiver system 320, through the earth's atmosphere. The receiver system 320 is any receiver system configured to receive the occulted radio signals from the transmitter system 310, down convert the radio occultation signals, low pass filter the down converted signal, and determine the in-phase and quadrature components of the signal. The receiver memory 326 could be any memory or storage media that stores data for the receiver processor 324 and instructions to be executed by the receiver processor 324. The receiver processor 324 is configured to calculate, prior to an occultation, the phase model for the down conversion process. Alternatively, the receiver processor 324 can receive the phase model from the post-processing system 330. The receiver data transmitter 326 could be any transmitter configured to transfer the in-phase and quadrature components of the down converted and low pass filtered radio occultation signal to the post-processing system 330. The post-processing system 330 is any system configured to receive the down converted and low pass filtered radio occultation signals (in-phase and quadrature components) and determine the accumulated phase and amplitude of the radio occultation signals 108 based on the determined in-phase and quadrature components and the phase model used for down conversion. The post-processing system memory 332 could be any memory or storage media that stores data for the post-processing system processor 334 and instructions to be executed by the post-processing system processor 334. The post-processing system processor 334 is configured to perform a sliding-window spectral analysis of the complex sampled radio occultation signals to determine the residual mean frequency of the sampled radio occultation signals 108. The post-processing system processor 334 is also configured to additionally down convert the sampled radio occultation signals 108 to mean zero frequency in order to eliminate aliasing, and to resample the complex radio occultation signals at a higher rate, and to recurrently calculate the accumulated phase and amplitude of the re-sampled radio occultation signals 108. The post-processing system data receiver 332 could be any transceiver configured to receive the radio occultation signals 108 from the receiving system 320 and transfer these signals to the post-processing system processor 334 and its associated memory 336.

Satellite System Example

One example of such a system for determining the phase and amplitude of a radio occultation signal makes use of a transmitter system 310 (such as Global Positioning System satellite 104), a receiver system 320 (such as Low Earth Orbiting satellite 106). The L1 carrier frequency transmitted by the Global Positioning System satellite 104 is $\cong 1.5$ GHz, while the Doppler frequency shift of the occulted radio signal 108 received by the Low Earth Orbiting satellite 106 is on the order of several tens of kHz. The portion of the Doppler shift related to the refraction of radio waves in the atmosphere can be as large as ~1 kHz. The maximum spread of the spectrum of the radio occultation signals 108, which occurs after propagation through the moist tropical troposphere, for example, is $\cong \pm 25$ Hz. With the use of the frequency model based only on predicted orbits of the Global Positioning System satellite 104 and the Low Earth Orbiting satellite 106, the mean residual frequency of the radio occultation signals 108 after the real-time down conversion can be as large as ~1 kHz, and thus the filtering bandwidth must be as large as ~2 kHz. With the use of the frequency model that takes into account refraction of radio waves in a standard atmosphere, the mean frequency of the radio occultation signals 108 can be predicted to an accuracy of about 15–20 Hz. Thus, the filtering bandwidth can be reduced to ±50 Hz and this substantially increases the signal-to-noise ratio. For sampling of the down converted radio occultation signals 108 without aliasing, a 100 Hz sampling rate is necessary, but this rate can be reduced to the spread of the spectrum, such as 50 Hz. Sampling at below 50 Hz results in aliasing with overlapping harmonics that cannot be repaired by post-processing, while sampling at 50 Hz results in aliasing due to the mean Doppler mis-modeling, but without overlapping of the harmonics. To eliminate this aliasing, the additional down conversion, based on detected mean frequency shift of the sampled signal is applied in post-processing. Sampling at a minimal rate which does not result in overlapping of spectral components of the radio occultation signals reduces the amount of data that has to be collected and transmitted to the Post Processing System 330.

Operation of the System

FIG. 4 illustrates in flow diagram form the operation of the present system for determining the phase and amplitude of radio occultation signals 300. The process is initiated at step 400 and proceeds to step 402, where the processor 324 of the receiver system 320 calculates a phase and/or frequency model prior to an occultation. The phase and/or frequency model is based on predicted positions and velocities of the transmitter system 310 and the receiver system 320 and is based on some model that accounts for refraction of radio waves in a standard atmosphere. The model of the refraction effect is typically a model of ray bending angle as a function of the altitude of the ray asymptote over the earth's reference ellipsoid. The phase and/or frequency model can also be created at another location and up-linked to the receiver system 320 by the post processing system 330.

In step 404, the receiver system 320 receives the radio signal 108 that is transmitted by the transmitter system 310 through the earth's atmosphere 102 where it is occulted. Alternatively, the radio signal 108 can also be occulted by, the earth's ionosphere 103, a planetary body's atmosphere, or a planetary body's ionosphere. Under conditions of low signal-to-noise ratio the pre-calculated phase model is used for aiding demodulation of the GPS signal. At step 406, the receiver system 320 down converts the received radio occultation signal 108 using the phase and/or frequency model calculated at step 402. The receiver system 320 low pass filters the down converted radio occultation signal 108 at step 408 and then samples the In-phase (I) and Quadrature components of the down converted and low pass filtered radio signal at step 410. In one embodiment the receiver system 320 samples the down converted and low pass filtered signal 108 at a rate equal to the double-sided sampling bandwidth. In this embodiment, the sampling bandwidth is within plus or minus the Nyquist frequency, i.e., is equal to the filter bandwidth of 100 Hz, which allows for direct reconstruction of the phase and amplitude from the sampled I and Q components. In another embodiment the receiver system 320 samples the down converted and low pass filtered signal 108 at a rate equal to the spread of the signal spectrum, 50 Hz. This results in aliasing of the spectral components, but without overlapping. The aliasing is eliminated further in post processing by an additional down conversion (steps 412, 414). Under most tropospheric conditions, the structure of the radio occultation signal 108 may be fairly well captured by the 50 Hz sampling bandwidth after the additional down conversion which eliminates aliasing. The receiver system 320 also transfers the In-phase and Quadrature components of the down converted and low pass filtered radio signal to the post-processing system 330.

In step 412, the post-processing system 330 performs a sliding-window spectral analysis of the down converted, low pass filtered, and sampled complex radio occultation signal to determine the mean residual frequency shift as a function of time. This function is further used as a frequency model for an additional down conversion (step 414). The sliding window duration should be large enough to allow sufficient resolution of harmonics in each spectrum and small enough to allow sufficient resolution of the mean frequency shift of the signal as a function of time.

At step 414, the post-processing system 330 performs an additional down conversion of the down converted, low pass filtered and sampled radio occultation signal using the frequency model determined at step 412. This down conversion minimizes the deviation of the mean frequency of the signal from zero and thus eliminates (or, at least, substantially reduces) the aliasing. At step 416, the post-processing system 330 performs a re-sampling of the signal received from step 414 at a higher rate than the sampling process used in steps 410–414 so the phase change between epochs becomes much smaller than half a cycle. The post-processing system 330 at step 418 calculates the phase and amplitude of the down converted complex radio occultation signal. The continuous (accumulated) phase is calculated from the raw phase by successive comparison of the raw phases for adjacent samples and adding 0 or ±2π to minimize modulo of their difference. In this way, cycle slips are removed from the phase data. At step 420, the accumulated phase is corrected by the post-processing system 330 by taking into account the solution of the transmitter system 310 and receiver system 320 oscillators and relativistic effects. Finally, processing ends at step 422.

Summary

The present system for determining the phase and amplitude of a radio occultation signal that modifies the traditional Open Loop tracking process to maximize the signal-to-noise ratio, minimize the sampling rate, and also preserve the structure of the radio occultation signals. The present system for determining the phase and amplitude of a radio occultation signal therefore obtains a signal-to-noise ratio that is comparable to Phase Locked Loop signal processing, by using Open-Loop tracking.

Those skilled in the art will appreciate variations of the above-described embodiments that fall within the scope of the invention. As a result, the invention is not limited to the specific examples and illustrations discussed above, but only by the following claims and their equivalents.

What is claimed:

1. A method for measuring phase and amplitude of a radio occultation signal, where the radio occultation signal is transmitted from a satellite-based transmitter to a receiver through an atmosphere, the method comprising the steps of:
   receiving the radio occultation signal;
   down converting the received radio occultation signal based on at least one of a phase and frequency model to generate a down converted radio occultation signal;
   low pass filtering said down converted radio occultation signal;
   sampling in-phase and quadrature components of said down converted and filtered radio occultation signal; and
   determining the phase and amplitude of the radio occultation signal based on said sampled in-phase and quadrature components.

2. The method of claim 1 further comprising the step of:
   determining at least one of a phase and frequency model of the radio occultation signal prior to an occultation.

3. The method of claim 2 wherein said step of determining at least one of a phase and a frequency model comprises:
   the use of predicted positions and velocities of said transmitter and said receiver and account for refraction of radio waves in the atmosphere by use of refractivity climatology.

4. The method of claim 3 wherein said step of determining at least one of a phase and frequency model comprises:
   computing said at least one of a phase and a frequency model using a model of the radio signal bending angle as a function of the height of the ray asymptote over the reference ellipsoid.

5. The method of claim 3 wherein said step of determining at least one of a phase and frequency model comprises:
   computing said at least one of a phase and a frequency model using refractivity climatology which depends on latitude and season.

6. The method of claim 3 wherein said step of determining at least one of a phase and frequency model comprises:
   computing said at least one of a phase and a frequency model using a refractivity climatology that is independent of latitude and seasons.

7. The method of claim 1 wherein said step of determining the phase and amplitude comprises:
   an additional down conversion of said sampled radio occultation signal which reduces its mean residual frequency to zero and thus eliminates aliasing.

8. The method of claim 7 wherein said step of additional down conversion comprises:
   determining a model of the mean residual frequency of said sampled radio occultation signal based on the sliding window spectral analysis.

9. The method of claim 8 wherein said step of determining the model of the mean residual frequency comprises:
   computing said model of the mean residual frequency using a model of the shape of a radio occultation signal spectrum.

10. The method of claim 7 wherein said step of determining the phase and amplitude further comprises:
    re-sampling said additionally down converted radio occultation signal at a higher rate and determining the accumulated phase by recurrent comparison of raw phases for adjacent samples.

11. The method of claim 1 wherein said radio occultation signal is a GPS signal, said step of receiving the radio occultation signal comprises:
    demodulating with the aid of said at least one of a phase and frequency model the GPS radio occultation signal under conditions of low signal-to-noise ratio.

12. A radio occultation system for measuring a phase and amplitude of a radio occultation signal, where the radio occultation signal is transmitted from a satellite-based transmitter to a receiver through an atmosphere, the radio occultation system comprising:
    a receiver system comprising:
      means for receiving the radio occultation signal;
      means for down converting the radio occultation signal based on at least one of a phase and frequency model to generate a down converted radio occultation signal;
      means for low pass filtering said down converted radio occultation signal;
      means for sampling in-phase and quadrature components said down converted and filtered radio occultation signal; and
    a post-processing system, responsive to said sampled in-phase and quadrature components of the radio occultation signal, for determining the accumulated phase and amplitude of the radio occultation signal.

13. The radio occultation system of claim 12 further comprising:

means for calculating at least one of a phase and a frequency model of a radio occultation signal prior to an occultation.

14. The radio occultation system of claim 13 further comprising:

means, responsive to predicted positions and velocities of said transmitter and receiver for taking into account refraction of radio waves in the atmosphere by use of refractivity climatology.

15. The radio occultation system of claim 14 wherein said means for taking into account refraction of radio waves comprises:

means for computing said frequency model using a model of the radio signal ray bending angle as a function of the height of ray asymptote over the reference ellipsoid.

16. The radio occultation system of claim 14 wherein said means of determining at least one of a phase and frequency model comprises:

means for computing said at least one of a phase and a frequency model using a refractivity climatology which depends on latitude and season.

17. The radio occultation system of claim 14 wherein said means for determining at least one of a phase model and a frequency model comprises:

means for computing said at least one of a phase and a frequency model using a refractivity climatology that is independent of latitude and season.

18. The radio occultation system of claim 12 wherein said post processing system comprises:

means for an additional down conversion of said sampled radio occultation signal which reduces its mean frequency to zero and thus eliminates aliasing.

19. The radio occultation system of claim 18 wherein said means for the additional down conversion comprises:

means for computing a model of the mean residual frequency of said sampled radio occultation signal based on sliding window spectral analysis.

20. The radio occultation system of claim 19 wherein said means for computing a model of mean residual frequency comprises:

means for computing said model of the mean residual frequency using a model of the shape of the radio occultation signal spectrum.

21. The radio occultation system of claim 12 wherein said post processing system further comprises:

means for re-sampling said additionally down converted radio occultation signal at a higher rate and computing the accumulated phase by recurrent comparison of raw phases for adjacent samples.

22. The radio occultation system of claim 12 wherein said radio occultation signal is a GPS signal, said means for receiving the radio occultation signal comprises:

means for demodulating with the aid of said at least one of a phase and frequency model the GPS radio occultation signal under conditions of low signal-to-noise ratio.

* * * * *

UNITED STATES PATENT AND TRADEMARK OFFICE
CERTIFICATE OF CORRECTION

PATENT NO.         : 6,731,906 B2
APPLICATION NO.    : 09/840261
DATED              : May 4, 2004
INVENTOR(S)        : Sergey Sokolovskiy and Christian Rocken It is certified that error appears in the above-identified patent and that said Letters Patent is hereby corrected as shown below:

At Column 1, line 6 insert the following:

-- GOVERNMENT LICENSE RIGHTS

The present invention was made with Government support under Cooperative Agreement No. ATM-9732665 awarded by the National Science Foundation. The Government has certain rights in this invention. --

Signed and Sealed this
Thirtieth Day of October, 2012

David J. Kappos
*Director of the United States Patent and Trademark Office*